United States Patent
Marics

(10) Patent No.: US 9,088,648 B2
(45) Date of Patent: Jul. 21, 2015

(54) SYSTEM AND METHOD FOR EFFECTING PREARRANGED NOTIFICATION FOLLOWING PLACING OF A CALL USING A PREDETERMINED NUMBER

(75) Inventor: Monica Ann Marics, Boulder, CO (US)

(73) Assignee: West Corporation, Omaha, NE (US)

(*) Notice: Subject to any disclaimer, the term of this patent is extended or adjusted under 35 U.S.C. 154(b) by 619 days.

(21) Appl. No.: 13/096,616

(22) Filed: Apr. 28, 2011

(65) Prior Publication Data

US 2012/0275590 A1    Nov. 1, 2012

(51) Int. Cl.
*H04M 3/00* (2006.01)
*H04M 3/42* (2006.01)
*H04M 1/738* (2006.01)
*H04M 3/533* (2006.01)

(52) U.S. Cl.
CPC ............ *H04M 3/4228* (2013.01); *H04M 1/738* (2013.01); *H04M 3/42153* (2013.01); *H04M 3/42382* (2013.01); *H04M 3/533* (2013.01); *H04M 2242/04* (2013.01)

(58) Field of Classification Search
CPC ... H04M 3/323; H04M 11/04; H04M 11/045; H04M 2242/04; H04M 3/493; H04M 15/38; H04M 15/00; H04M 11/025; H04M 15/36; H04M 3/42; H04M 1/56; H04M 2242/22; H04M 3/18; H04Q 3/00; H04Q 3/0004; H04Q 1/028
USPC .......... 379/22.06, 37–51, 254, 312, 316, 332, 379/350, 433.05, 438, 9.06, 88.19–88.21, 379/93.03, 118, 120, 127.01, 127.06, 379/167.11, 183, 207.13–207.15, 245, 379/413.04, 413.03; 455/404, 404.1, 521
See application file for complete search history.

(56) References Cited

U.S. PATENT DOCUMENTS

| | | | |
|---|---|---|---|
| 5,889,468 A * | 3/1999 | Banga | 340/628 |
| 6,288,642 B1 * | 9/2001 | Dohrmann | 340/540 |
| 7,023,982 B1 * | 4/2006 | Grandin-Drevin et al. | 379/387.01 |
| 2004/0151282 A1 * | 8/2004 | Jones et al. | 379/37 |
| 2004/0268119 A1 * | 12/2004 | Smetters et al. | 713/155 |
| 2007/0195942 A1 * | 8/2007 | Woodring | 379/207.15 |
| 2012/0170719 A1 * | 7/2012 | Nelson | 379/45 |

OTHER PUBLICATIONS

Intrado.com, General Public Safety News. "Ooma Provides Real-Time Emergency Alerts with New 911 Notifications Feature; New Feature Available Today for Ooma Premier Subscribers." May 10, 2011. All General Public Safety@ilists.intrado.com.

* cited by examiner

*Primary Examiner* — Akelaw Teshale

(57) ABSTRACT

A system for effecting at least one prearranged notification after a calling instrument places a call using a predetermined number; the system including: (a) a jack unit for coupling the calling instrument with an outgoing telecommunication connection; and (b) a server unit coupled with the outgoing telecommunication connection. The server unit is coupled with a plurality of notification media. The jack unit detects when the calling instrument places the call using the predetermined number. When the call is completed, the jack unit alerts the server unit of a completion of the call to the predetermined number. The server unit responds to the alerting by effecting the at least one prearranged notification via at least one notification medium of the plurality of notification media.

20 Claims, 3 Drawing Sheets

SYSTEM AND METHOD FOR EFFECTING PREARRANGED NOTIFICATION FOLLOWING PLACING OF A CALL USING A PREDETERMINED NUMBER

FIELD OF THE INVENTION

The present invention is directed to telecommunication systems, and especially to carrying out prearranged notifications when a call is made to a predetermined number.

BACKGROUND OF THE INVENTION

Provision of notification following a call to a predetermined number such as such as a 9-1-1 or other emergency call has been disclosed. The disclosed notifications are either automatically triggered by a 9-1-1 call detected somewhere in a telecommunication system other than the origin of the call or triggered by a follow-up information request by a PSAP (Public Safety Answering Position; sometimes referred to as a Public Safety Answering Point) or other emergency services personnel. For example, notification that a 9-1-1 call has occurred is disclosed as being automatically generated by monitoring voice telephone trunks in U.S. Pat. No. 5,195,126 to Carrier et al. for "Emergency Alert and Security Apparatus and Method", issued Mar. 16, 1993 (hereinafter referred to as "Carrier"); by monitoring SS7 messages in U.S. Pat. No. 6,427,001 B1 to Contractor et al. for "System and Method for Notification of 911 Telephone Calls using a Link Monitoring System", issued Jul. 30, 2002 (hereinafter referred to as "Contractor"); and by using an ALI (Automatic Location Identification, or Automatic Location Information) system trigger in U.S. Pat. No. 6,151,385 to Reich et al. for "System for the Automatic Notification that a 9-1-1 Call has Occurred", issued Nov. 21, 2000 (hereinafter referred to as "Reich"). Notification that a 9-1-1 call has occurred is also disclosed as being automatically generated by monitoring wireless or wireline calls at a point along a network path in U.S. Pat. No. 6,775,356 to Salvucci et al. for "Real-Time Incident and Response Information Messaging in a System for the Automatic Notification That an Emergency Call Has Occurred from a Telecommunication Device", issued Aug. 10, 2004 (hereinafter referred to as "Salvucci1"); and in U.S. Patent Application Publication 2004/0105529 of Jun. 3, 2004, by Salvucci et al. for "Real-Time Incident and Response Information Messaging in a System for the Automatic Notification That an Emergency Call Has Occurred from a Wireless Telecommunication Device", a Division of Salvucci1 (hereinafter referred to as "Salvucci2").

Notification generated following a request by emergency services personnel is disclosed by U.S. Pat. No. 5,805,670 to Pons et al. for "Private Notification System for Communicating 9-1-1 Information", issued Sep. 8, 1998 (hereinafter referred to as "Pons"); and by U.S. Pat. No. 6,600,812 to Gentillin et al. for "Method and Apparatus for Providing Emergency Response Information" issued Jul. 29, 2003 (hereinafter referred to as "Gentillin").

Notification using a hybrid method, where an alternate embodiment of the current 9-1-1 ALI system identifies a notification subscriber but the PSAP call taker initiates the notification sequence, is disclosed by U.S. Pat. No. 6,587,545 to Antonucci et al. for "System for Providing Expanded Emergency Service Communication in a Telecommunication Network", issued Jul. 1, 2003 (hereinafter referred to as "Antonucci").

Sending critical subscriber data, such as subscriber language preference, medical conditions or records, building layouts from either a single database or from third party stores to public safety personnel, subscribers, or other third parties is described in Pons, Antonucci and Gentillin.

All of these patents require arrangements for monitoring various system components other than the origin of the phone call or participation by emergency service or other personnel for identifying that an emergency service call has been placed to initiate a process resulting in notifications being made.

There are numerous patents disclosing Central Station Alarm or Personal Emergency Response (PERS) systems. In many of these systems, either an electronic sensor or a call button transmits an emergency services request signal to a central monitoring service operator. A human or computer operator evaluates the emergency services request signal and then contacts a Public Safety Answering Point (PSAP) to request emergency dispatch by First Responders (police, fire or EMT) to selected signals. These emergency signal requests are not automatically routed to PSAP dispatch centers in the same way as 9-1-1 calls made from wired or wireless phones today, although systems that could enable such interconnection in the future have been disclosed. Other Central Station Alarm or Personal Emergency Response (PERS) systems have been disclosed which interface with the PSTN (Public Switched Telephone Network) using either wired or wireless technologies to make a 9-1-1 call on behalf of a user who may not be able to complete an emergency call request due to disability or remoteness.

In a system disclosed in U.S. Pat. No. 6,614,883 to Baum et al. for "Emergency Call System" (hereinafter referred to as "Baum"), a user depresses a key or button on an emergency call unit or on a pendant that the user is wearing to initiate notification to a plurality of other parties using a pre-programmed message.

There is a need for a system and method for effecting prearranged notification following placing of a call using a predetermined number such as, by way of example and not by way of limitation, an emergency number, which system is installable and programmable by a user without requiring sophisticated monitoring of remote aspects of a telecommunication system.

SUMMARY OF THE INVENTION

A system for effecting at least one prearranged notification after a calling instrument places a call using a predetermined number using an outgoing telecommunication connection; the system including: (a) a jack unit for coupling with the outgoing telecommunication connection; and (b) a server unit coupled with the outgoing telecommunication connection. The server unit is coupled with a plurality of notification media. The jack unit detects when the calling instrument places the call using the predetermined number. When the call is completed, the jack unit alerts the server unit of a completion of the call to the predetermined number. The server unit responds to the alert by effecting the at least one prearranged notification via at least one notification medium of the plurality of notification media.

A method for effecting at least one prearranged notification after a calling instrument places a call using a predetermined number using an outgoing telecommunication connection; the method comprising: (a) in no particular order: (1) providing a jack unit for coupling with the outgoing telecommunication connection; and (2) providing a server unit coupled with the outgoing telecommunication connection and coupled with a plurality of notification media; (b) operating the jack unit to effect detecting when the calling instrument places the call using the predetermined number; (c) when the call is completed, operating the jack unit to effect alerting the server unit of a completion of the call to the predetermined number; and (d) operating the server unit to effect responding to the alerting by effecting the at least one prearranged notification via at least one notification medium of the plurality of notification media.

It is, therefore a feature of the present invention to provide system and method for effecting prearranged notification following placing of a call using a predetermined number such as, by way of example and not by way of limitation, an emergency number, which system is installable and programmable by a user without requiring sophisticated monitoring of remote aspects of a telecommunication system.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

For purposes of illustration, by way of example and not by way of limitation, the present invention will be discussed at times in the context of an emergency service network in the United States, commonly referred to as an E9-1-1 network. The teachings of the present invention are equally applicable, useful and novel in other networks and in other special number calling systems, such as maintenance service networks, college campus security networks and other networks.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

For purposes of this disclosure, the term "telecommunication connection" may be understood to include any connection capable of supporting conveyance by telecommunication operations such as, by way of example and not by way of limitation, a Private Branch Exchange (PBX) conveyance, a voice over Internet Protocol (VoIP) conveyance, a fixed wired conveyance (e.g., a Plain Old Telephone System; POTS), a Wireless Fidelity (WiFi) conveyance, a wireless voice network, a cable coaxial conveyance and a digital subscriber line conveyance.

For purposes of this disclosure, the term "alert" may be understood to mean: 1. (noun) a signal or other medium intended for causing a recipient to exercise vigilance or watchfulness, or intended to advise a recipient of the occurrence of an event or condition; 2. (verb) to make a recipient aware of a need to exercise vigilance or watchfulness, or to make a recipient aware of the occurrence of an event or condition.

Figure 1:
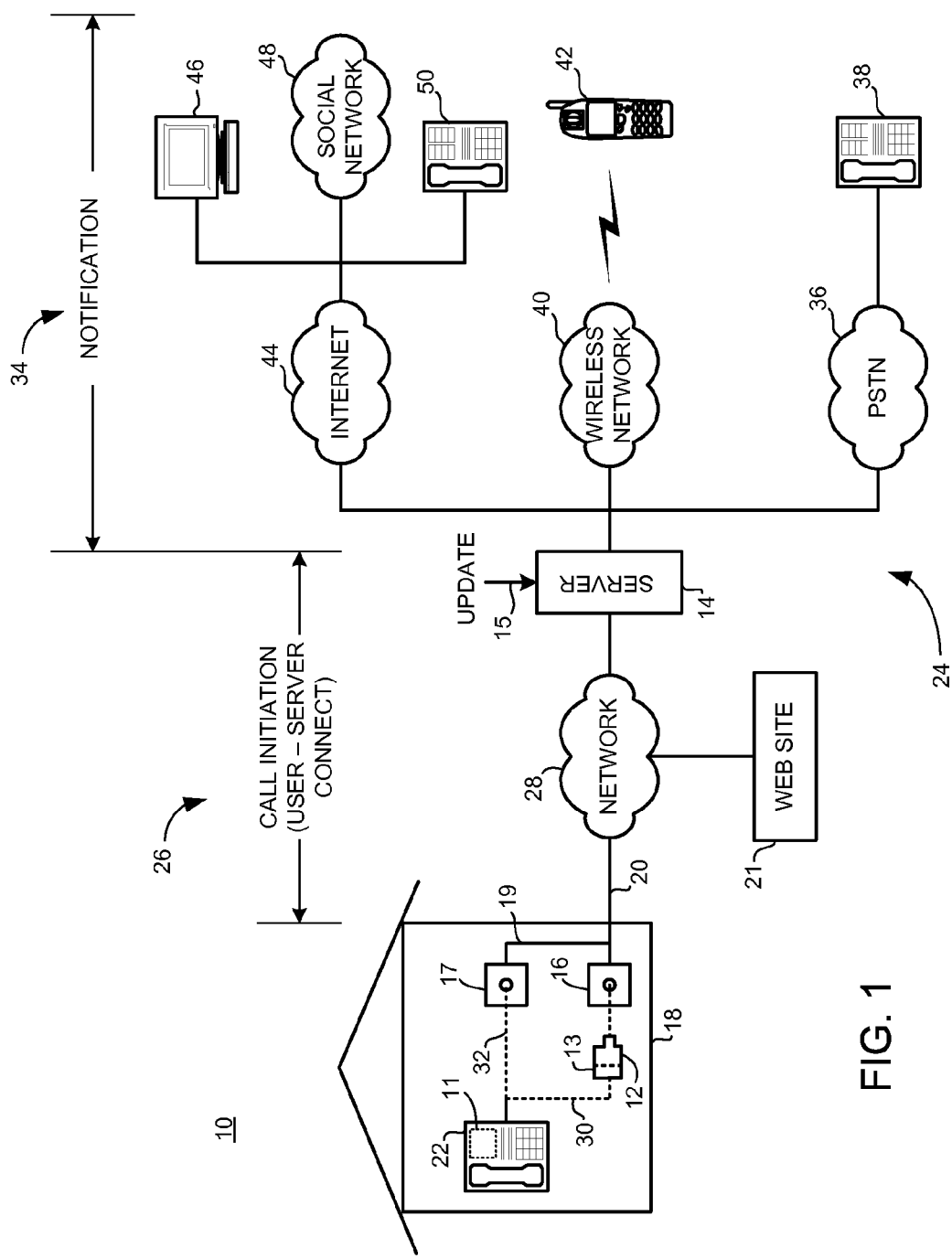
FIG. 1 is a schematic diagram illustrating a system for effecting prearranged notification after a calling instrument places a call using a predetermined number.

FIG. 1 is a schematic diagram illustrating a system for effecting prearranged notification after a calling instrument places a call using a predetermined number. In FIG. 1, a system 10 includes a jack unit 12 and a server unit 14. Jack unit 12 is coupled with a first installed phone connector 16 in a building 18. First installed phone connector 16 is coupled with a building phone line 19, and building phone line 19 is coupled with an outgoing telecommunication connection 20. Outgoing telecommunication connection 20 may communicatively serve building 18. Building 18 may be a residence, an office building, a store or another structure providing phone services as described herein. A calling unit 22 in building 18 may be communicatingly coupled with outgoing telecommunication connection 20 via jack unit 12 in series with first installed phone connector 16 and building phone line 19, as indicated by a first connecting line 30. Alternatively, calling unit 22 may be communicatingly coupled with outgoing telecommunication connection 20 via a second installed phone connector 17 and building phone line 19, as indicated by a second connecting line 32. The alternative nature of connecting lines 30, 32 is indicated in FIG. 1 by using a dotted line format to indicate connecting lines 30, 32.

Telecommunication system 24 is not illustrated in its entirety as such a telecommunication system is understood by those skilled in the art of telecommunication systems design. However, telecommunication system 24 may be understood to include a call initiation portion 26 communicatingly coupling building 18 and calling unit 22 with server unit 14 via a network 28. Call initiation portion 26 may be implemented using one or various telecommunication technologies including, but not necessarily limited to fixed wireless technology, Voice over Internet Protocol (VoIP) technology conveyed via Digital Subscriber Line (DSL) or via cable modem and cable telephony conveyed via coaxial cable.

Server unit 14 may be employed in effecting notifications of parties with contact information stored in server unit 14. Server unit 14 may store, by way of example and not by way of limitation, a notification list indicating names and contact information, a notification log for recording attempts and successes in effecting notifications, billing information for administering billing for notification services and billing history indicating a current status of customers' bills. Information stored in server unit 14 is not indicated in FIG. 1 as those skilled in the art of server technology understand storage of information in a server unit such as server unit 14.

A website 21 may be provided for a customer of the notification service provided by jack unit 12 to access information stored in server unit 14. Web site 21 is illustrated as being coupled with network 28 merely as an example. As will be understood by those skilled in the art of telecommunication system design, web site 21 may be accessed by one or more of several ways including, but not limited to, via the Internet and via server unit 14. A customer of the notification service may use web site 21, by way of example and not by way of limitation, to maintain account information by adding, removing or changing contact information stored in server unit 14, including removing or changing predetermined numbers to which system 10 is to respond and changing the modality by which notification is to be made to a particular party. A customer may use web site 21 to view a log or similar record of notifications made by server unit 14 in response to calls placed to predetermined numbers, including who was notified, when they were notified and the duration of the call precipitating the notifications.

Server unit 14 may be coupled with a notification portion 34 of telecommunication system 24. Notification portion 34 may employ one or more communication technologies or modalities for effecting notification activities mandated by information stored in server unit 14. By way of example and not by way of limitation, notification portion 34 may include a Public Switched Telephone Network (PSTN) 36 for conveying recorded voice notifications to an analog phone unit 38.

By way of further example and not by way of limitation, notification portion 34 may include a wireless network 40 for conveying notifications to a wireless phone unit 42. Notifications to wireless phone unit 22 may be carried out, for example, using cellular technology, Short Message Service (SMS) messaging, Multimedia Messaging Service (MMS) messaging or recorded voice messages.

By way of yet another example and not by way of limitation, notification portion 34 may include an Internet network 44 for conveying notifications via email to a Personal Computer (PC) 46. Other notification modalities may be used for PC 46 such as recorded voice message, or attachments to emails. Internet network 44 may convey notifications via posts to one or more social networks 48 such as, for example, Facebook, Twitter and My Space. Internet network 44 may also convey recorded voice or other notifications to a VoIP phone 50.

Jack unit 12 may be plugged into or otherwise coupled with building phone line 19 and detects when a phone call is placed on building phone line 19 using predetermined phone number such as, by way of example and not by way of limitation, an emergency service number like 9-1-1.

After a call placed using a predetermined number (there can be more than one predetermined number policed by jack unit 12) is completed and building phone line 19 returns to an idle state, jack unit 12 places a call to server unit 14 to alert server unit 14 that a call has been placed using a predetermined number. Server unit 14 responds to the alert from jack unit 12 to effecting notification activities mandated by information stored in server unit 14. Jack unit 14 may include a recorder unit 13 for recording a predetermined portion of a call placed using a predetermined number. The predetermined portion recorded may be all of the call, or may be part of the call say, by way of example and not by way of limitation, the first ninety seconds of the call. Recording unit 13 may be embodied in a digital recording device. Details of recording device 13 are not set forth in FIG. 1 because those details are known to those skilled in the art of digital recording device design.

An example of how system 10 may be advantageously employed by a user may begin with the user purchasing a jack unit 12 on-line or at a retail store. Once at home with the purchased jack unit 12, the user may go on-line to a predetermined web site (perhaps web site 21) to identify parties to be notified in the event a call is placed from his phone number. Other ways may be made available to a user for entering or updating information stored in server unit 14, as indicated by an update port 15, and as discussed in greater detail in connection with FIG. 2. Billing information may be collected at server 14 as well at this point in the process. Billing information may include, by way of example and not by way of limitation, a credit card number, bank account number, PayPal account information or similar information permitting on-line billing of the user. When provisioning of required information by the user to server unit 14 (perhaps via web site 21) is complete, the user is provided an activation code.

After provisioning is complete, the user may install jack unit 12 by plugging jack unit 12 into an installed phone connection 16, 17. Jack unit 12 may receive a plug connection from calling unit 22 to establish series connection among calling unit 22, jack unit 12, an installed phone connection 16, 17 and outgoing telecommunication connection 20. Alternately, jack unit 12 and calling unit 22 may be plugged into different installed phone connections 16, 17.

Continuing an installation procedure, a user may dial a system 10 phone number provided during the provisioning procedure or when jack unit 12 was purchased. The system 10 phone number connects calling unit 22 with server unit 14, and server unit 14 is enabled to read Automatic Number Identification (ANI) data regarding the origin of the call relating to calling unit 22 and building 18. The user inputs the earlier-provided activation code to server unit 14 to complete the installation procedure. System 10 thereafter may check to ensure that calling unit 22 is detected, thus completing installation by server unit 14.

After completion of installation jack unit 12 continuously monitors or polices building phone line 19. When a predetermined number is dialed, jack unit 12 waits until building line 19 is idle and then places a call to server unit 14 to alert server unit 14 regarding, for example, the ANI of calling unit 22, time-date information and that a call was placed using a predetermined number. During an alerting call, jack unit 12 may play a recording of the call placed using a predetermined number if a recording unit 13 is installed and managed to record the call or a portion of the call. The recording may be stored with server unit 14 and may be included with later notifications carried out by server unit 14.

In response to receiving an alert that a call was placed by calling unit 22 using a predetermined number, server 14 first notes the ANI that placed the call (i.e., calling unit 22 ANI) to server 14 and records the time-date-call duration information regarding the call placed using the predetermined number. Server 14 may then check to confirm that the received ANI is from a valid subscriber to the notification service associated with jack unit 12 and that the notification service account is paid up with no overdue bills. Server 14 may thereafter retrieve the notification list associated with the received ANI. The notification list may include names and notification modalities associated with the notification names such as, by way of example and not by way of limitation, notification via email, via recorded voice message, via SMS message, via MMS message, via posting to a social network or via another notification modality.

Server 14 may thereafter launch the notifications on the customer's stored list using the respective modalities indicated. Each notification attempt may be logged and the logged notification information may be pushed to a web site accessible by the customer for retrieval and review such as web site 21.

Figure 2:
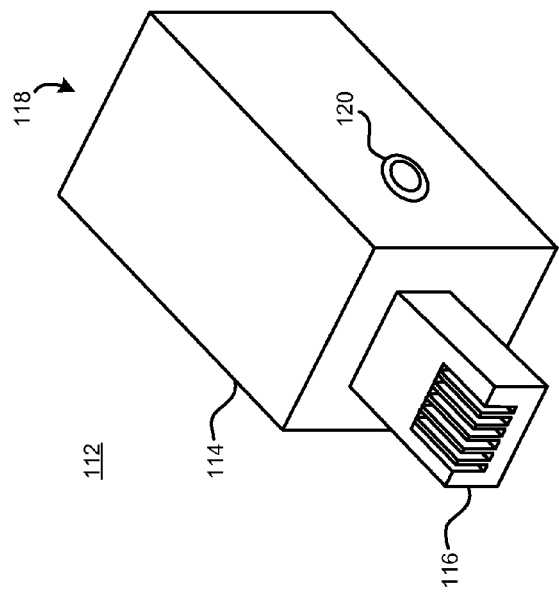
FIG. 2 is a schematic diagram illustrating various ways that the server unit illustrated in FIG. 1 may be updated.

FIG. 2 is a schematic diagram illustrating various ways that the server unit illustrated in FIG. 1 may be updated. In FIG. 2, a provisioning system 60 is configured for updating information in server unit 14 (FIG. 1). Provisioning system 60 provides a provisioning interface 61 between various input technologies and server unit 14. Among other embodiments, portions of provisioning system 60 may be embodied in web site 21 (FIG. 1).

Provisioning system 60 is coupled with a communications or update port 15 associated with server unit 14 (FIG. 1). Server unit 14 may be updated based on preferences set up by a customer or subscriber and submitted via provisioning system 60 by any of various technologies known to those skilled in the art of telecommunication system design. Updating server unit 14 via update port 15 may be effected using one or more various connection configurations such as, by way of example and not by way of limitation, a computer 62, a phone 64, a facsimile machine 66 and a PDA (Personal Digital Assistant) 68 or another communication device such as a smart phone or a computer tablet (not shown in FIG. 2). In the case of a smart phone or a computer tablet, for example, a special application (or "app" as they are sometimes called) may be developed to assist in using a smart phone or computer tablet for updating server unit 14.

In an alternate embodiment, jack unit 12 may be contained in an application that may be loaded for use in calling unit 22, as indicated at block 11 in FIG. 1. The alternate nature of this embodiment is intended to be indicated by presenting block 11 in dotted-line format. This embodiment may be employed whether calling unit 22 is a wireline phone, a VoIP phone, wireless phone, an automatic calling device associated with an Automatic Crash Notification (ACN) system or another calling device.

Figure 3:
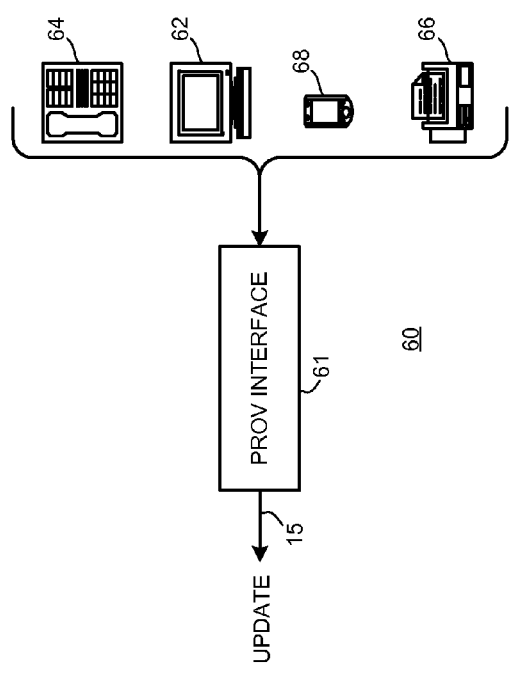
FIG. 3 is a perspective view of a jack unit configured for use with the inventive system.

FIG. 3 is a perspective view of a jack unit configured for use with the inventive system. In FIG. 3, a jack unit 112 may include a body 114 with a modular plug 116 extending from body 114. Modular plug 116 may be of a construction commonly known in the telecommunication industry for coupling various units together. Modular plug 116 may be integrally formed with body 114 or may depend from body 114 via a length of connector such as telephone wire (not shown in FIG. 3; understood by those skilled in the art of telecommunication system design). Modular plug 116 in FIG. 3 is a male plug unit for insertion into a receiving female plug for connection with building phone line 19 (FIG. 1). Alternatively, jack unit 112 maybe equipped with two male modular plugs or two female modular plugs. Such connection is known by those skilled in the art of telecommunication system design and is not disclosed in detail here. Similarly, if calling unit 22 (FIG. 1) is to be coupled in series with jack unit 112, a male modular plug similar to modular plug 116 may be provided for connection with calling unit 22 and inserted into a receiving female plug 118 in body 114 (not visible in FIG. 3; indicated generally at 118). A test button 120 may be provided to permit launching of test messages to server unit 14 (FIG. 1) to ensure proper operation of system 10 without having to make a phone call using a predetermined number. Server unit 14 may be configured to respond to a test message via a web connection, by posting a response on a web site, by a pre-recorded voice message to the caller unit from which the test message is launched, by another feedback mechanism or by a combination of feedback mechanisms to ensure a user is advised whether the test indicated a successful operation of jack unit 112 and its related system components.

Figure 4:
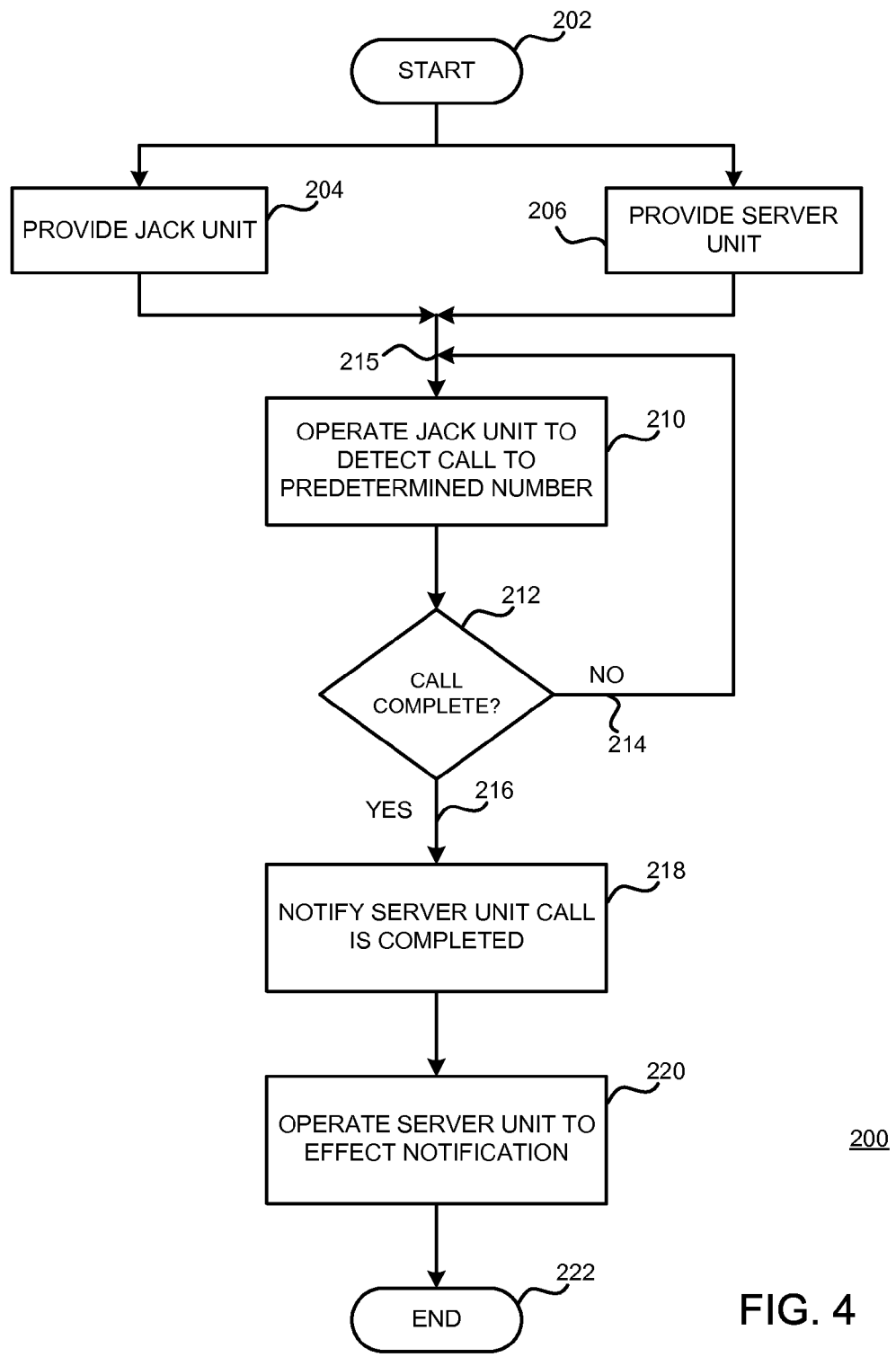
FIG. 4 is a flow diagram illustrating a method for effecting prearranged notification after a calling instrument places a call using a predetermined number.

FIG. 4 is a flow diagram illustrating a method for effecting prearranged notification after a calling instrument places a call using a predetermined number. In FIG. 4, a method 200 for effecting at least one prearranged notification after a calling instrument places a call using a predetermined number using an outgoing telecommunication connection begins at a START locus 202.

Method 200 continues with, in no particular order: (1) providing a jack unit for coupling with the outgoing telecommunication connection, as indicated by a block 204; and (2) providing a server unit coupled with the outgoing telecommunication connection and coupled with a plurality of notification media, as indicated by a block 206.

Method 200 continues with operating the jack unit to effect detecting when the calling instrument places the call using the predetermined number, as indicated by a block 210.

Method 200 continues with posing a query whether the call is completed, as indicated by a query block 212. If the call is not completed, method 200 proceeds from query block 212 via a NO response line 214 to a locus 215 and thereafter continues with method 200 as indicated by blocks 210, 212. If the call is completed, method 200 proceeds from query block 212 via a YES response line 216 to operate the jack unit to effect alerting the server unit of a completion of the call to the predetermined number, as indicated by a block 218.

Method 200 continues with operating the server unit to effect responding to the alerting by effecting the at least one prearranged notification via at least one notification medium of the plurality of notification media, as indicated by a block 220. Method 200 terminates at an END locus 222.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A system for effecting at least one prearranged notification after a calling instrument places a call using a predetermined number using an outgoing telecommunication connection; the system comprising:
   (a) a jack unit for coupling between an installed phone connection and said outgoing telecommunication connection, said installed phone connection coupled to said calling instrument, said jack unit configured to detect when said calling instrument makes a call using said predetermined number, configured to detect when said outgoing telecommunication connection is idle immediately after said call, and configured to transmit an alert signal upon detection of said outgoing telecommunication connection becoming idle immediately after said call; and
   (b) a server unit coupled with said outgoing telecommunication connection; said server unit being coupled with a plurality of notification media; said server unit configured to receive said alert signal from said jack unit and configured to respond to said alert signal by effecting said at least one prearranged notification via at least one notification medium of said plurality of notification media.

2. The system for effecting at least one prearranged notification after a calling instrument places a call using a predetermined number using an outgoing telecommunication connection as recited in claim 1 wherein said plurality of notification media includes at least one of a public switched telephone network, a wireless network, and an Internet Protocol network.

3. The system for effecting at least one prearranged notification after a calling instrument places a call using a predetermined number using an outgoing telecommunication connection as recited in claim 1 wherein said at least one prearranged notification is carried out according to instructions stored in said server unit.

4. The system for effecting at least one prearranged notification after a calling instrument places a call using a predetermined number using an outgoing telecommunication connection as recited in claim 1 wherein said outgoing telecommunication connection supports communication with said server unit employing at least one of a wired conveyance, a cable conveyance and a wireless conveyance.

5. The system for effecting at least one prearranged notification after a calling instrument places a call using a predetermined number using an outgoing telecommunication connection as recited in claim 2 wherein said at least one prearranged notification is carried out according to instructions stored in said server unit.

6. The system for effecting at least one prearranged notification after a calling instrument places a call using a predetermined number using an outgoing telecommunication connection as recited in claim 2 wherein said outgoing telecommunication connection supports communication with said server unit employing at least one of a wired conveyance, a cable conveyance and a wireless conveyance.

7. The system for effecting at least one prearranged notification after a calling instrument places a call using a predetermined number using an outgoing telecommunication connection as recited in claim 5 wherein said outgoing telecommunication connection supports communication with said server unit employing at least one of a wired conveyance, a cable conveyance and a wireless conveyance.

8. A system for effecting at least one prearranged notification after a calling instrument places an emergency service call using an outgoing telecommunication connection: the system comprising:
 (a) a jack unit for coupling with an installed phone connection and said outgoing telecommunication connection said jack unit configured to detect when said calling instrument places said emergency call, configured to detect when the outgoing telecommunication connection is idle immediately after said emergency call and configured to generate an alert signal after detecting that said calling instrument placed said emergency call and detecting that said outgoing telecommunication connection is idle immediately after said emergency call; and
 (b) a server unit coupled with said outgoing telecommunication connection; said server unit being coupled with a plurality of notification media; said jack unit detecting when said calling instrument places said emergency service call; when said outgoing telecommunication connection is idle after said emergency service call is completed, said jack unit alerting said server unit of occurrence of said emergency service call; said server unit responding to said alerting by effecting said at least one prearranged notification via at least one notification medium of said plurality of notification media.

9. The system for effecting at least one prearranged notification after a calling instrument places an emergency service call using an outgoing telecommunication connection as recited in claim 8 wherein said plurality of notification media includes at least one of a public switched telephone network, a wireless network, and an Internet Protocol network.

10. The system for effecting at least one prearranged notification after a calling instrument places an emergency service call using an outgoing telecommunication connection as recited in claim 8 wherein said at least one prearranged notification is carried out according to instructions stored in said server unit.

11. The system for effecting at least one prearranged notification after a calling instrument places an emergency service call using an outgoing telecommunication connection as recited in claim 8 wherein said outgoing telecommunication connection supports communication with said server unit employing at least one of a wired conveyance, a cable conveyance and a wireless conveyance.

12. The system for effecting at least one prearranged notification after a calling instrument places an emergency senlice callusing an outgoing telecommunication connection as recited in claim 9 wherein said at least one prearranged notification is carried out according to instructions stored in said server unit.

13. The system for effecting at least one prearranged notification after a calling instrument places an emergency service call using an outgoing telecommunication connection as recited in claim 9 wherein said outgoing telecommunication connection supports communication with said server unit employing at least one of a wired conveyance, a cable conveyance and a wireless conveyance.

14. The system for effecting at least one prearranged notification after a calling instrument places an emergency service call using an outgoing telecommunication connection as recited in claim 12 wherein said outgoing telecommunication connection supports communication with said server unit employing at least one of a wired conveyance, a cable conveyance and a wireless conveyance.

15. A method for effecting at least one prearranged notification after a calling instrument places a call using a predetermined number using an outgoing telecommunication connection; the method comprising:
 (a) in no particular order:
  (1) providing a jack unit for coupling with an installed phone connection with said outgoing telecommunication connection; and
  (2) providing a server unit coupled with said outgoing telecommunication connection and coupled with a plurality of notification media;
 (b) operating said jack unit to effect detecting when said calling instrument places said call using said predetermined number;
 (c) when said outgoing telecommunication connection is idle after said call is completed, operating said jack unit to effect alerting said server unit of occurrence of said call to said predetermined number; and
 (d) operating said server unit to effect responding to said alerting by effecting said at least one prearranged notification via at least one notification medium of said plurality of notification media.

16. The method for effecting at least one prearranged notification after a calling instrument places a call using a predetermined number using an outgoing telecommunication connection as recited in claim 15 wherein said plurality of notification media includes at least one of a public switched telephone network, a wireless network, and an Internet Protocol network.

17. The method for effecting at least one prearranged notification after a calling instrument places a call using a predetermined number using an outgoing telecommunication connection as recited in claim 15 wherein said at least one prearranged notification is carried out according to instructions stored in said server unit.

18. The method for effecting at least one prearranged notification after a calling instrument places a call using a predetermined number using an outgoing telecommunication connection as recited in claim 15 wherein said outgoing telecommunication connection supports communication with said server unit employing at least one of a wired conveyance, a cable conveyance and a wireless conveyance.

19. The method for effecting at least one prearranged notification after a calling instrument places a call using a predetermined number using an outgoing telecommunication connection as recited in claim 16 wherein said at least one prearranged notification is carried out according to instructions stored in said server unit.

20. The method for effecting at least one prearranged notification after a calling instrument places a call using a predetermined number using an outgoing telecommunication connection as recited in claim 12 wherein said outgoing telecommunication connection supports communication with said server unit employing at least one of a wired conveyance, a cable conveyance and a wireless conveyance.

* * * * *